(12) United States Patent
Kuthuru et al.

(10) Patent No.: US 11,601,750 B2
(45) Date of Patent: Mar. 7, 2023

(54) MICROPHONE CONTROL BASED ON SPEECH DIRECTION

(71) Applicant: Hewlett-Packard Development Company, L.P., Spring, TX (US)

(72) Inventors: Srikanth Kuthuru, Palo Alto, CA (US); Sunil Bharitkar, Palo Alto, CA (US)

(73) Assignee: Hewlett-Packard Development Company, L.P, Spring, TX (US)

( * ) Notice: Subject to any disclaimer, the term of this patent is extended or adjusted under 35 U.S.C. 154(b) by 0 days.

(21) Appl. No.: 17/252,314

(22) PCT Filed: Dec. 17, 2018

(86) PCT No.: PCT/US2018/066069
§ 371 (c)(1),
(2) Date: Dec. 15, 2020

(87) PCT Pub. No.: WO2020/131018
PCT Pub. Date: Jun. 25, 2020

(65) Prior Publication Data
US 2021/0337308 A1    Oct. 28, 2021

(51) Int. Cl.
*H04R 3/00* (2006.01)
*G10L 25/51* (2013.01)
*H04M 3/56* (2006.01)

(52) U.S. Cl.
CPC ............. *H04R 3/005* (2013.01); *G10L 25/51* (2013.01); *H04M 3/568* (2013.01)

(58) Field of Classification Search
CPC ...... H04R 3/005; H04R 1/1083; H04R 1/406; H04R 2460/01; H04R 5/033; H04R 5/04;
(Continued)

(56) References Cited

U.S. PATENT DOCUMENTS 6,754,373 B1   6/2004  de Cuetos et al.
9,167,204 B2  10/2015  Sanaullah et al.
(Continued)

FOREIGN PATENT DOCUMENTS

CN    1813284 A    8/2006
CN  103561367 A    2/2014
CN  104111814 A   10/2014

OTHER PUBLICATIONS

Ishi, Cados T. et al. Speech Activity Detection and Face Orientation Estimation Using Multiple Microphone Arrays and Human Position Information, 2015 IEEE/RSJ Int'l Conf on Intelligent Robots and Systems (IROS) Sep. 28-Oct. 2, 2015, Hamburg, Germany.
(Continued)

*Primary Examiner* — Lun-See Lao
(74) *Attorney, Agent, or Firm* — Quarles & Brady LLP

(57) ABSTRACT

According to examples, an apparatus may include a processor and a non-transitory computer readable medium on which is stored instructions that the processor may execute to access an audio signal captured by a microphone of a user's speech while the microphone is in a muted state. The processor may also execute the instructions to analyze a spectral or frequency content of the accessed audio signal to determine whether the user was facing the microphone while the user spoke. In addition, based on a determination that the user was facing the microphone while the user spoke, the processor may execute the instructions to unmute the microphone.

15 Claims, 7 Drawing Sheets

(58) Field of Classification Search
CPC .. H04R 1/028; H04R 2201/023; H04R 5/027; H04R 5/0335; H04R 1/1016; H04R 2410/01; H04R 25/407; H04R 29/006; H04R 3/12; H04R 1/005; H04R 1/04; H04R 1/083; H04R 1/1008; H04R 1/2876; H04R 1/46; H04R 2420/01; H04R 2420/07; H04R 2430/01; H04R 27/00; H04R 7/02; G10K 11/17823; G10K 2210/1081; G10K 11/17857; G10K 11/17881; G10K 11/175; G10K 11/17837; G10K 11/17854; G10K 11/17885; G10K 2210/3014; G10K 2210/3028; G10K 2210/3044; G10K 11/178; G10K 11/17821; G10K 11/17853; G10K 11/17873; G10K 2210/3214; H04H 60/58; H04H 20/28; H04H 20/61; H04H 20/88; H04H 60/31; H04L 41/00; H04L 41/5025; H04L 41/5067; H04L 41/509; H04L 65/00; H04L 65/1069; H04L 65/4069; H04L 65/607; H04L 65/80; H04M 1/6058; H04M 1/72442; H04M 3/2227; H04M 1/573; H04M 11/04; H04M 2207/20; H04M 2242/04; H04M 2242/22; H04M 2242/30; H04M 3/42042; H04M 3/4931; H04M 3/568; H04M 9/001; H04B 1/44; H04N 21/4131; H04N 21/4221; H04N 21/42222; H04N 21/42224; H04N 21/478; H04N 21/6118; H04N 21/6168; H04N 7/142; H04N 7/147; H04N 7/17309; H04N 7/18

USPC .............................. 381/92, 1, 56–58; 700/94
See application file for complete search history.

(56) References Cited

U.S. PATENT DOCUMENTS

| | | | |
|---|---|---|---|
| 9,319,513 | B2 | 4/2016 | Guo et al. |
| 9,386,147 | B2 | 7/2016 | MoDysan et al. |
| 9,756,187 | B2 | 9/2017 | Chintala |
| 9,940,944 | B2 | 4/2018 | Finlow-Bates et al. |
| 10,491,995 | B1* | 11/2019 | Enstad .................. H04R 3/005 |
| 2008/0091421 | A1 | 4/2008 | Gustavsson |
| 2008/0167868 | A1* | 7/2008 | Kanevsky ............... G10L 15/24 |
| | | | 704/E15.041 |
| 2013/0294612 | A1* | 11/2013 | Feng ..................... H04R 3/005 |
| | | | 381/92 |
| 2014/0309999 | A1 | 10/2014 | Basson et al. |
| 2015/0085064 | A1 | 3/2015 | Sanaullah et al. |
| 2015/0156598 | A1* | 6/2015 | Sun ........................ G10L 25/48 |
| | | | 348/14.07 |
| 2016/0055859 | A1* | 2/2016 | Finlow-Bates ..... H04M 1/6008 |
| | | | 704/225 |

OTHER PUBLICATIONS

Kayser, H. et al. "A Discriminative Learning Approach to Probabilistic Acoustic Source Localization," Published in: 2014 14th International Workshop on Acoustic Signal Enhancement (IWAENC), pp. 99-103.

* cited by examiner

```
┌─────────────────────────────────────────────┐
│  NON-TRANSITORY COMPUTER READABLE MEDIUM    │
│                    600                      │
│                                             │
│  ┌───────────────────────────────────────┐  │
│  │ ACCESS AN AUDIO FILE OF A USER'S      │  │
│  │ SPEECH CAPTURED BY A MICROPHONE       │  │
│  │                 602                   │  │
│  └───────────────────────────────────────┘  │
│                                             │
│  ┌───────────────────────────────────────┐  │
│  │ DETERMINE WHETHER THE MICROPHONE      │  │
│  │ WAS IN A MUTED STATE WHEN THE         │  │
│  │ MICROPHONE CAPTURED THE USER'S SPEECH │  │
│  │                 604                   │  │
│  └───────────────────────────────────────┘  │
│                                             │
│  ┌───────────────────────────────────────┐  │
│  │ BASED ON A DETERMINATION THAT THE     │  │
│  │ MICROPHONE WAS IN THE MUTED STATE     │  │
│  │ WHEN THE MICROPHONE CAPTURED THE      │  │
│  │ USER'S SPEECH, APPLY A MACHINE        │  │
│  │ LEARNING MODEL ON THE CAPTURED        │  │
│  │ USER'S SPEECH TO DETERMINE WHETHER    │  │
│  │ THE USER WAS LIKELY FACING THE        │  │
│  │ MICROPHONE WHEN THE USER SPOKE,       │  │
│  │ THE MACHINE LEARNING MODEL BEING      │  │
│  │ GENERATED USING A CLASSIFIER THAT     │  │
│  │ WAS TRAINED USING TRAINING DATA       │  │
│  │ CORRESPONDING TO USERS' DIRECTIONS    │  │
│  │ DURING THE USERS' SPEECH              │  │
│  │                 606                   │  │
│  └───────────────────────────────────────┘  │
│                                             │
│  ┌───────────────────────────────────────┐  │
│  │ BASED ON A DETERMINATION THAT THE     │  │
│  │ USER WAS LIKELY FACING THE MICROPHONE │  │
│  │ WHEN THE USER SPOKE, OUTPUT AN        │  │
│  │ INDICATION FOR THE USER TO PLACE THE  │  │
│  │ MICROPHONE INTO AN UNMUTED STATE      │  │
│  │                 608                   │  │
│  └───────────────────────────────────────┘  │
└─────────────────────────────────────────────┘
```

*FIG. 6*

MICROPHONE CONTROL BASED ON SPEECH DIRECTION

BACKGROUND

Telecommunications applications, such as teleconferencing and videoconferencing applications, may facilitate communications between multiple remotely located users to communicate with each other over an Internet Protocol network, over a land-based telephone network, and/or over a cellular network. Particularly, the telecommunications applications may cause audio to be captured locally for each of the users and communicated to the other users such that the users may hear the voices of the other users via these networks. Some telecommunications applications may also enable still and/or video images of the users to be captured locally and communicated to the other users such that the users may view the other users via these networks.

BRIEF DESCRIPTION OF DRAWINGS

Features of the present disclosure are illustrated by way of example and not limited in the following figure(s), in which like numerals indicate like elements, in which:

FIG. 6 shows a block diagram of an example non-transitory computer readable medium that may have stored thereon machine readable instructions that when executed by a processor, may cause the processor to prompt a user to unmute a microphone based on a determination that the user was likely facing the microphone when the user spoke.

DETAILED DESCRIPTION

Figure 1:
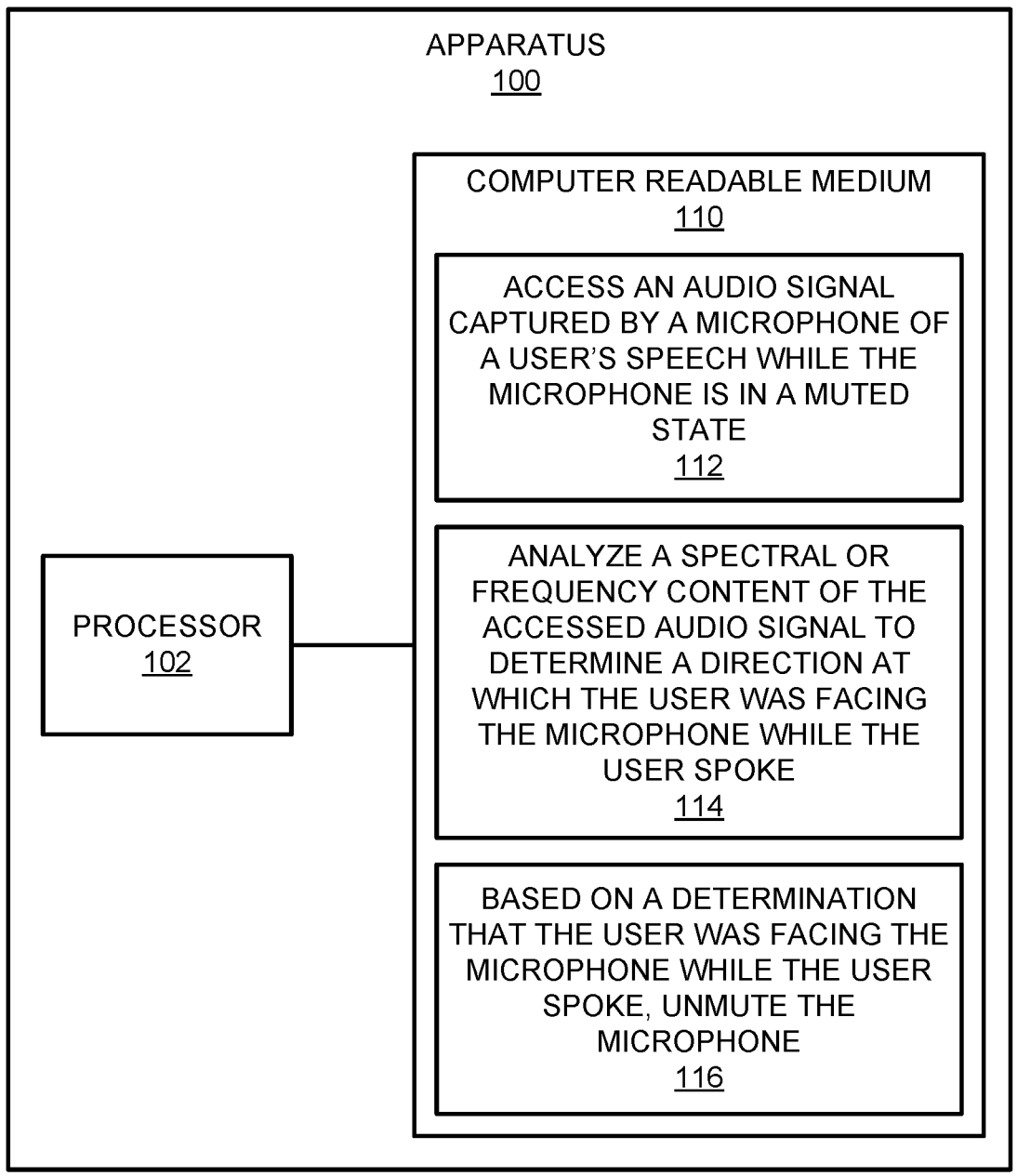
FIG. 1 shows a block diagram of an example apparatus that may automatically control unmuting of a microphone based on whether the user was likely facing the microphone while the user spoke.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

When audio conferencing applications are activated, the microphones may begin at a muted state. Oftentimes, users may not be aware that their microphones are in the muted state and may thus begin speaking prior to unmuting their microphones. This may result in confusion at the beginning of the teleconference. This may also occur when users intentionally mute their microphones during an audio conference or during other applications and forget to unmute their microphones prior to speaking again.

Disclosed herein are apparatuses, systems, and methods for automatically unmuting a microphone based on a determination that a user intended for the user's speech to be captured. For instance, a processor may determine whether the user was facing the muted microphone when the user spoke and based on that determination, automatically unmute the microphone. The processor may make that determination through analysis of a spectral or frequency content of an audio signal captured by the microphone. In addition, or alternatively, the processor may make that determination through application of a machine learning model on the captured audio signal. In some examples, the processor may implement a voice activity detection technique to determine whether the captured audio signal includes a user's voice. In some examples, the determination as to whether the user was facing the muted microphone may be premised on training a fully-connected neural network (FCNN) or a convolutional neural network (CNN) to identify directivity of speech.

In some examples, characteristics of a second audio signal captured by a second microphone may be analyzed with the audio signal captured by the microphone to determine whether user was likely facing the microphone and the second microphone while the user spoke. In these examples, the processor may determine whether to unmute the microphone and the second microphone based on the determination as to whether the user was facing the microphone discussed above and the determination based on the analysis of the characteristics of the audio signal and the second audio signal.

Through implementation of the apparatuses, systems, and methods disclosed herein, a microphone may automatically be unmuted and/or a user may be prompted to unmute the microphone based on a determination that a user was facing the muted microphone when the user spoke. Thus, for instance, the user's speech may be directed to an application for analysis, storage, translation, or the like. As another example, the user's speech may be directed to a communication interface to be output during an audio conference. In any regard, the audio captured while the microphone was muted may be stored and used for an application and/or an audio conference, which may reduce additional processing that may be performed to capture, analyze, and store audio that may be repeated in instances in which the previously captured audio is lost or discarded.

Figure 2A:
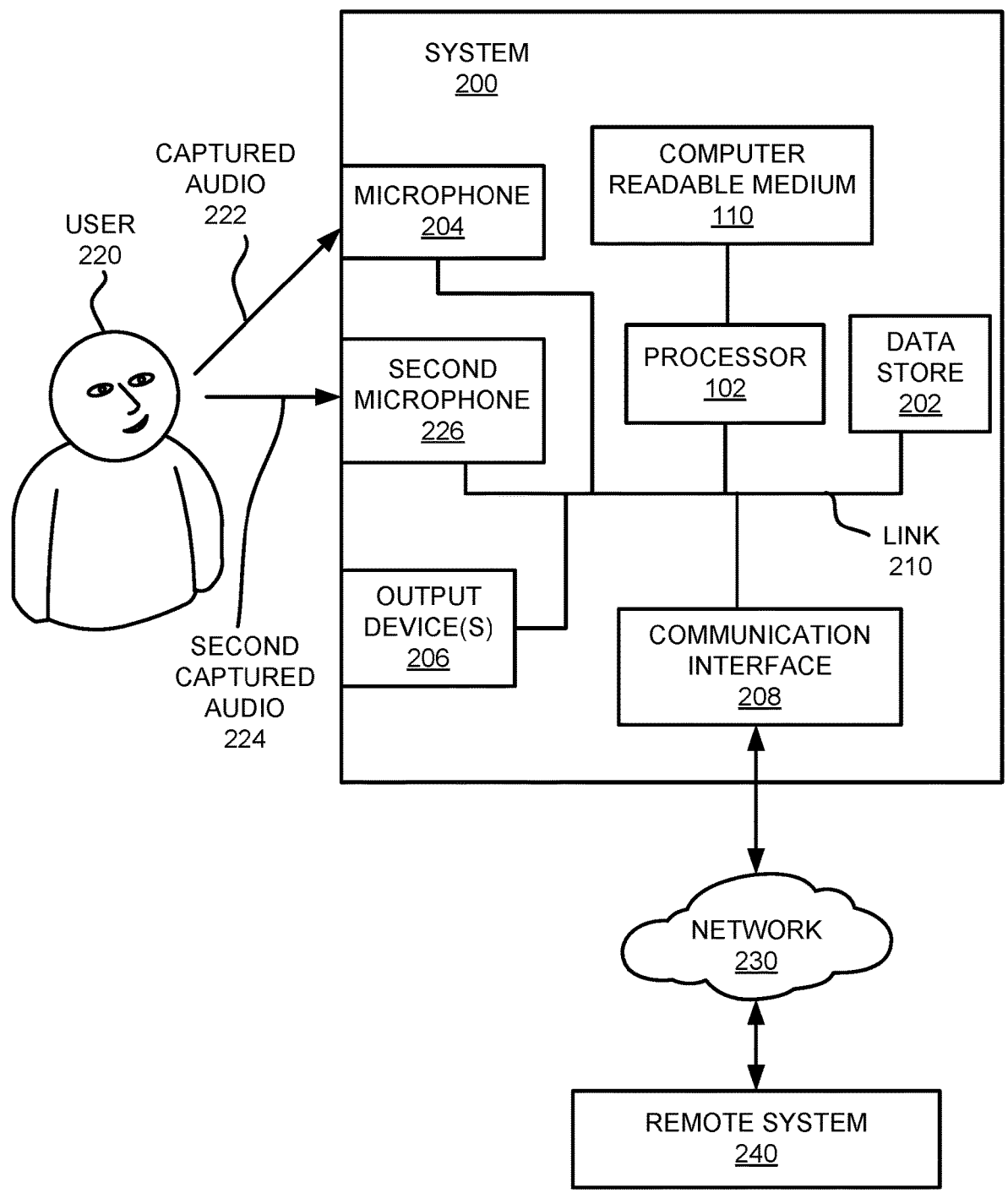
FIG. 2A shows a block diagram of an example system that may include features of the example apparatus depicted in FIG. 1.
Figure 2B:
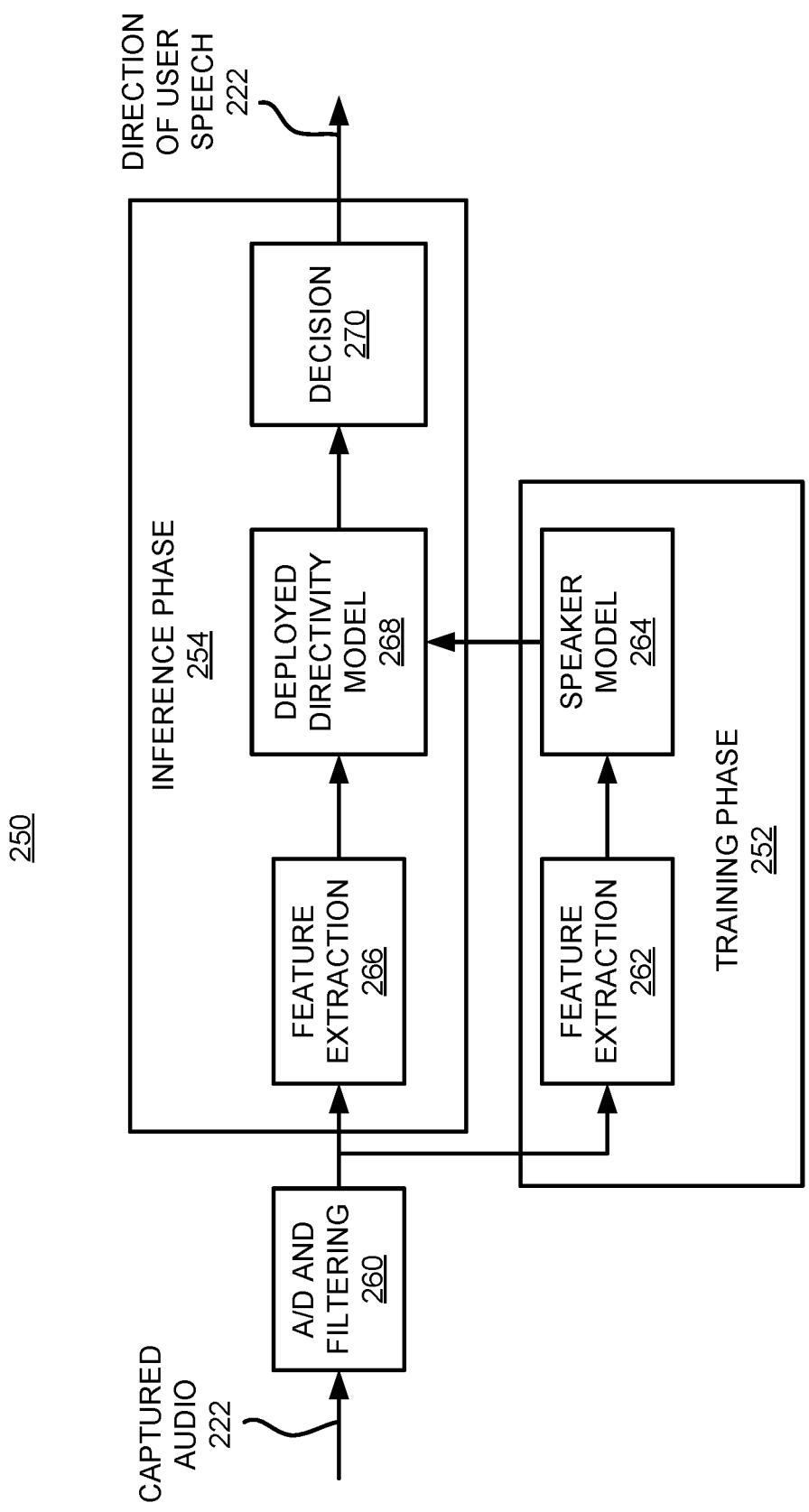
FIG. 2B shows an example process block diagram of operations that may be performed during a training phase and an inference phase of a captured audio signal.

Reference is first made to FIGS. 1, 2A, and 2B. FIG. 1 shows a block diagram of an example apparatus 100 that may automatically control unmuting of a microphone based on whether the user was likely facing the microphone while the user spoke. FIG. 2A shows a block diagram of an example system 200 that may include features of the example apparatus 100 depicted in FIG. 1. FIG. 2B shows an example process block diagram 250 of operations that may be performed during a training phase and an inference phase of a captured audio signal 222. It should be understood that the example apparatus 100, the example system 200, and/or the example process block diagram 250 depicted in FIGS. 1, 2A, and 2B may include additional components and that some of the components described herein may be removed and/or modified without departing from the scopes of the example apparatus 100, the example system 200, and/or the example process block diagram 250 disclosed herein.

The apparatus 100 may be a computing device or other electronic device, e.g., a personal computer, a laptop computer, a tablet computer, a smartphone, or the like, that may facilitate automatic unmuting of a microphone 204 based on a determination that a user 220 was facing the microphone 204 while the user 220 spoke. That is, the apparatus 100 may capture audio signals 222 of a user's speech while the microphone 204 is muted and may automatically unmute the microphone 204 based on a determination that the user 220 was facing the microphone 204 while the user 220 spoke. In addition, based on a determination that the user 220 was facing the microphone 204 while the user spoke, the apparatus 100 may store the captured audio 222, may activate a voice dictation application, may communicate the captured audio signal 222 with a remotely located system 240, for instance, via a network 230, and/or the like.

According to examples, the processor 102 may selectively communicate audio signals, e.g., data files including the audio signals, of the captured audio 222 over a communication interface 208. The communication interface 208 may include software and/or hardware components through which the apparatus 100 may communicate and/or receive data files. For instance, the communication interface 208 may include a network interface of the apparatus 100. The data files may include audio and/or video signals, e.g., packets of data corresponding to audio and/or video signals.

According to examples, the apparatus 100, and more particularly, a processor 102 of the apparatus 100, may determine whether the audio signals 222 include audio intended by the user 220 to be communicated to another user, e.g., via execution of an audio or video conferencing application, and may communicate the audio signals based on a determination that the user 220 intended for the audio to be communicated to the other user. However, based on a determination that the user may not have intended for the audio to be communicated, the processor 102 may not communicate the audio signals. The processor 102 may determine the user's intent with respect to whether the audio is to be communicated in various manners as discussed herein.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), a graphics processing unit (GPU), and/or other hardware device. The apparatus 100 may also include a non-transitory computer readable medium 110 that may have stored thereon machine readable instructions 112-118 (which may also be termed computer readable instructions) that the processor 102 may execute. The non-transitory computer readable medium 110 may be an electronic, magnetic, optical, or other physical storage device that includes or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

As shown in FIG. 2A, the system 200 may include the processor 102 and the computer readable medium 110 depicted in FIG. 1. The system 200 may also include a data store 202, a microphone 204, output device (or multiple output devices) 206, and a communication interface 208. Electrical signals may be communicated between some or all of the components 102, 110, 202-208 of the system 200 via a link 210, which may be a communication bus, a wire, and/or the like.

The processor 102 may execute or otherwise implement a telecommunications application to facilitate a teleconference or a videoconference meeting to which a user 220 may be a participant. The processor 102 may also or alternatively implement another type of application that may use and/or store the user's speech. In any regard, the microphone 204 may capture audio (or equivalently, sound, audio signals, etc.), and in some examples, may communicate the captured audio 222 over a network 230 via the communication interface 208. The network 230 may be an IP network, a telephone network, and/or a cellular network. In addition, the captured audio 222 may be communicated across the network 230 to a remote system 240 such that the captured audio 222 may be outputted at the remote system 240. The captured audio 222 may be converted and/or stored in a data file and the communication interface 208 may communicate the data file over the network 230.

In operation, the microphone 204 may capture the audio 222 and may communicate the captured audio 222 to the data store 202 and/or the processor 102. In addition, the microphone 204 or another component may convert the captured audio 222 or may store the captured audio 222 in a data file. For instance, the captured audio 222 may be stored or encapsulated in IP packets. In some examples, the microphone 204 may capture the audio signal 222 while the microphone 204 is in a muted state. That is, while in the muted state, the microphone 204 may continue to capture the audio signals 222 and the processor 102 may continue to process the captured audio signals 222, but may not automatically send the captured audio signals 222 to the communication interface 208. While in an unmuted state, the microphone 204 may capture the audio signals 222 and the processor 102 may process the captured audio 222 and may send the captured audio 222 to the communication interface 208 for the captured audio 222 to be communicated over the network 230.

The processor 102 may fetch, decode, and execute the instructions 112 to access an audio signal 222 captured by the microphone 204 of a user's 220 speech while the microphone 204 is in a muted state. As discussed herein, while the microphone 204 is in the muted state, the microphone 204 may capture audio signals 222 and may store the captured audio signals 222 in the data stored 202. As such, for instance, the processor 102 may access the captured audio signal 222 from the data store 202.

The processor 102 may fetch, decode, and execute the instructions 114 to analyze a spectral or frequency content of the accessed audio signal 222 to determine a direction at which the user 220 was while the user spoke. That is, for instance, the processor 102 may perform a spectral and/or frequency content analysis of the accessed audio signal 222 to determine whether the user 220 was facing the microphone while the user 220 was spoke. For example, when the user 220 is facing away from the microphone 204, the captured audio 222 may have lower intensities in the high frequency range due to high frequency roll-off. By training a classifier using training data corresponding to speech samples from different directions, e.g., corresponding to the user's directions during the user's speech, and different users, the user's 220 speech direction may be classified as being towards or away from the microphone 204, e.g., to the side of the microphone 204. That is, the ML model may be trained using speech samples of users facing a microphone and speech samples of users not facing the microphone and the ML model may capture differences in the spectral and/or frequency content of the speech samples to be able to distinguish whether the captured audio signal 222 includes spectral and/or frequency content consistent with speech that is of a user facing the microphone 204. This may be particularly useful when the ML model is deployed during inferencing during the start of a conference call on a voice over IP (VoIP) system. The ML model may also be used to switch between mute and unmute during the conference call.

The ML model may also use input from a voice activity detector (VAD), which may detect the presence or absence of human speech in audio signals. The ML model may employ manually-designed features, over each frame, such as spectral roll-off above a threshold frequency, the mean level in the measured spectrum, the difference spectrum over frames, and/or the like. Alternatively, a deep learning model employing a deep neural network (DNN), such as convolutional neural network (CNN), long short-term memory (LSTM) in cascade with a fully-connected neural network (FCNN), or the like, may be used to automatically extract deep features to train the machine learning model to classify between forward facing and side-facing (with head-motion) profiles.

The processor 102 may fetch, decode, and execute the instructions 116 to, based on a determination that the user 220 was facing the microphone 204 while the user 220 spoke, unmute the microphone 204. The processor 102 may unmute the microphone 204 based on a determination that the user 220 was facing the microphone 204 while the user spoke as that is likely an indication that the user 220 intended for the user's speech to be captured. In some instances, such as at the beginning of a conference call, the microphone 204 may default to the muted state and the user 220 may begin speaking without first changing the microphone to the unmuted state. As a result, the user 220 may need to repeat what the user 220 said, which the user 220 may find wasteful. Through implementation of the instructions 112-116, the user's 220 speech captured while the microphone 204 was muted may still be used when the speech is determined to likely have been made while the user 220 faced the microphone 204, which may enable the user 220 to continue speaking without having to repeat the earlier speech.

In some examples, the processor 102 may be remote from the microphone 204. In these examples, the processor 102 may access the captured audio signal 222 via the network 230 from a remotely located electronic device that may be connected to the microphone 204. In addition, the processor 102 may output an instruction to the remotely located electronic device via the network 230 to unmute the microphone 204. In response to receipt of the instruction, the remotely located electronic device may unmute the microphone 204.

The output device(s) 206 shown in the system 200 may include, for instance, a speaker, a display, and the like. The output device(s) 206 may output audio received, for instance, from the remote system 240. The output device(s) 206 may also output images and/or video received from the remote system 240.

Turning now to FIG. 2B, there is shown an example process block diagram 250 that the processor 102 may execute to determine a direction of user speech. As shown, the processor 102 may operate during a training phase 252 and an inference phase 254. Particularly, audio 222 captured by the microphone 204 may be converted from an analog signal to a digital signal and the digital signal may be filtered 260. During the training phase 252, e.g., a machine learning model training phase 252, feature extraction 262 may be applied on the converted and filtered signal. The extracted features of the converted and filtered signal may be used to generate a speaker model 264. The speaker model 264 may capture differences in the spectral and/or frequency content of converted and filtered signals to be able to distinguish whether the captured audio signal 222 includes spectral and/or frequency content consistent with speech that is of a user facing the microphone 204 or is consistent with speech that is of a user not facing the microphone 204. Thus, for instance, multiple converted and filtered signals may be used to generate the speaker model 264 during the training phase 252.

During the inference phase 254, features of the converted and filtered signals may be extracted 266. In addition, a deployed directivity model 268 may be applied on the extracted features. The deployed directivity model 268 may be generated using the speaker model 264 and may be used to determine a direction at which the user 220 spoke when the audio 222 was captured. Based on the application of the deployed directivity model 268, a decision 270 may be made as to the direction of the user speech 272, e.g., whether the user was facing the microphone 204 when the audio 222 was captured. In addition, the direction of the user speech 272 may be outputted, e.g., may be outputted to control operation of the microphone 204. As discussed herein, the direction of the user speech 272 may be used to determine whether a muted microphone 204 is to be unmuted.

Figure 3:
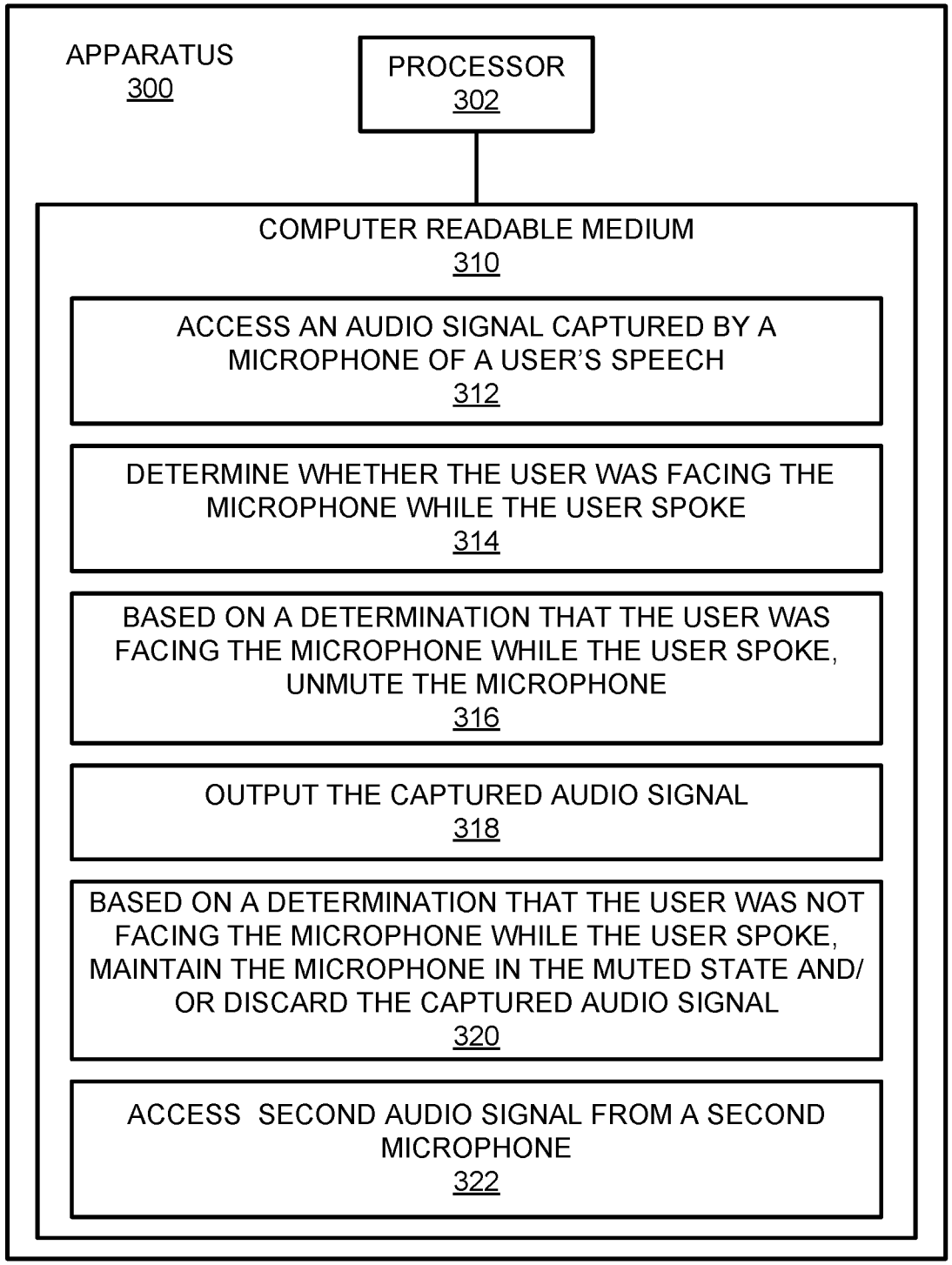
FIG. 3 shows a block diagram of an example apparatus that may automatically control unmuting of a microphone based on whether the user was likely facing the microphone when the user spoke.

Reference is now made to FIGS. 1-3. FIG. 3 shows a block diagram of an example apparatus 300 that may automatically control unmuting of a microphone 204 based on whether the user 220 was likely facing the microphone 204 when the user 220 spoke. It should be understood that the example apparatus 300 depicted in FIG. 3 may include additional components and that some of the components described herein may be removed and/or modified without departing from the scope of the example apparatus 300 disclosed herein.

The apparatus 300 may be similar to the apparatus 100 depicted in FIG. 1 and may thus include a processor 302, which may be similar to the processor 102, and a non-transitory computer readable medium 310, which may be similar to the non-transitory computer readable medium 110. The computer readable medium 310 may have stored thereon machine readable instructions 312-322 (which may also be termed computer readable instructions) that the processor 302 may execute.

The processor 302 may fetch, decode, and execute the instructions 312 to access to access an audio signal 222 captured by the microphone 204 of a user's 220 speech. As discussed herein, the microphone 204 may capture the audio signal 222 while the microphone 204 is in the muted state. In addition, the microphone 204 may capture audio signals 222 and may store the captured audio signals 222 in the data stored 202. As such, for instance, the processor 102 may access the captured audio signal 222 from the data store 202. In other examples in which the processor 302 is remote from the microphone 204, the processor 302 may access the audio signal 222 via the network 230.

The processor 302 may fetch, decode, and execute the instructions 314 to determine whether the user 220 was facing the microphone 204 when the user 220 spoke, e.g., generated the captured audio 222. As discussed herein, the processor 302 may perform a spectral and/or frequency content analysis of the accessed audio signal 222 to determine whether the user 220 was facing the microphone while the user 220 spoke. In addition or alternatively, the processor 302 may apply a machine learning model as discussed herein on the captured audio signal 222 to determine whether the user 220 was likely facing the microphone 204 when the user 220 spoke.

In some examples, the processor 302 may determine whether the microphone 204 was in a muted state when the microphone 204 captured the audio signal 222 of the user's 220 voice. In these examples, the processor 302 may determine whether the user 220 was facing the microphone 204 when the user 220 spoke based on a determination that the microphone 204 was in the muted state. In addition, the processor 302 may output the captured audio signal 222 without analyzing the spectral or frequency content of the captured audio signal 222 based on a determination that the microphone 204 was not in the muted state, e.g., was in the unmuted state, when the microphone 204 captured the audio signal 222 of the user's 220 voice.

The processor 302 may fetch, decode, and execute the instructions 316 to, based on a determination that the user 220 was facing the microphone 204 while the user 220 spoke, unmute the microphone 204. The processor 302 may unmute the microphone 204 based on a determination that the user 220 was facing the microphone 204 while the user spoke as that is likely an indication that the user 220 intended for the user's speech to be captured.

The processor 302 may fetch, decode, and execute the instructions 318 to, based on a determination that the user 220 was facing the microphone 204 while the user 220 spoke, output the captured audio signal 222. For instance, the processor 302 may output the captured audio signal 222 to the communication interface 208 such that the communication interface 208 may output the captured audio signal 222 to the remote system 240 via the network 230. In addition or alternatively, the processor 302 may output the captured audio signal 222 to an application or device for the captured audio signal 222 to be stored, translated, or the like.

The processor 302 may fetch, decode, and execute the instructions 320 to, based on a determination that the user 220 was not facing the microphone 204 while the user 220 spoke, maintain the microphone 204 in the muted state and/or discard the captured audio signal 222. That is, for instance, in addition to maintaining the microphone 204 in the muted state, the processor 302 may not output the captured audio signal 222 based on a determination that the user 220 was not facing the microphone 204 while the user 220 spoke.

The processor 302 may fetch, decode, and execute the instructions 322 to access a second audio signal 224 captured by a second microphone 226 of the user's 220 speech while the second microphone 226 is in a muted state, the second microphone 226 being spaced from the microphone 204. For instance, the second microphone 226 may be positioned at least a few inches from the microphone 204 such that sound waves may reach the second microphone 226 at a different time than the microphone 204 in instances in which the user 220 is facing to a side of one or both of the microphone 204 and the second microphone 226. By way of a particular example, the second microphone 226 may, for instance, be positioned on one side of a laptop computing device and microphone 204 may be positioned on an opposite side of the laptop.

The processor 302 may fetch, decode, and execute the instructions 314 to analyze characteristics of the audio signal 222 captured by the microphone 204 and the second audio signal 224 captured by the second microphone 226. For instance, the processor 302 may determine the timing at which the microphone 204 captured the audio signal 222 and the timing at which the second microphone 226 captured the second audio signal 224. For instance, the processor 302 may implement a time difference of arrival technique to detect the direction of the captured audio 222, 224.

The processor 302 may fetch, decode, and execute the instructions 314 to also determine whether the user 220 was facing the microphone 204 and the second microphone 226 while the user 220 spoke based on the analyzed characteristics. For instance, the processor 302 may determine that the user 220 was facing the microphone 204 and the second microphone 226 when the user 220 spoke based on a determination that the microphone 204 captured the audio signal 222 within a predefined period of time that the second microphone 226 captured the second audio 224. The predefined period of time may be based on testing and/or training using various user speech. In addition, the processor 302 may determine that the user 220 was not facing the microphone 204 and the second microphone 226 based on a determination that the microphone 204 captured the audio signal 222 outside of the predefined period of time that the second microphone 226 captured the second audio 224.

The processor 302 may fetch, decode, and execute the instructions 314 to further determine whether to unmute the microphone 304 and the second microphone 226 based on both the determination that the user 220 was facing the microphone 204 through analysis of the spectral or frequency content of the accessed audio signal 222 and the determination that the user 220 was facing the microphone 204 and the second microphone 226 based on the analyzed characteristics.

Figure 4:
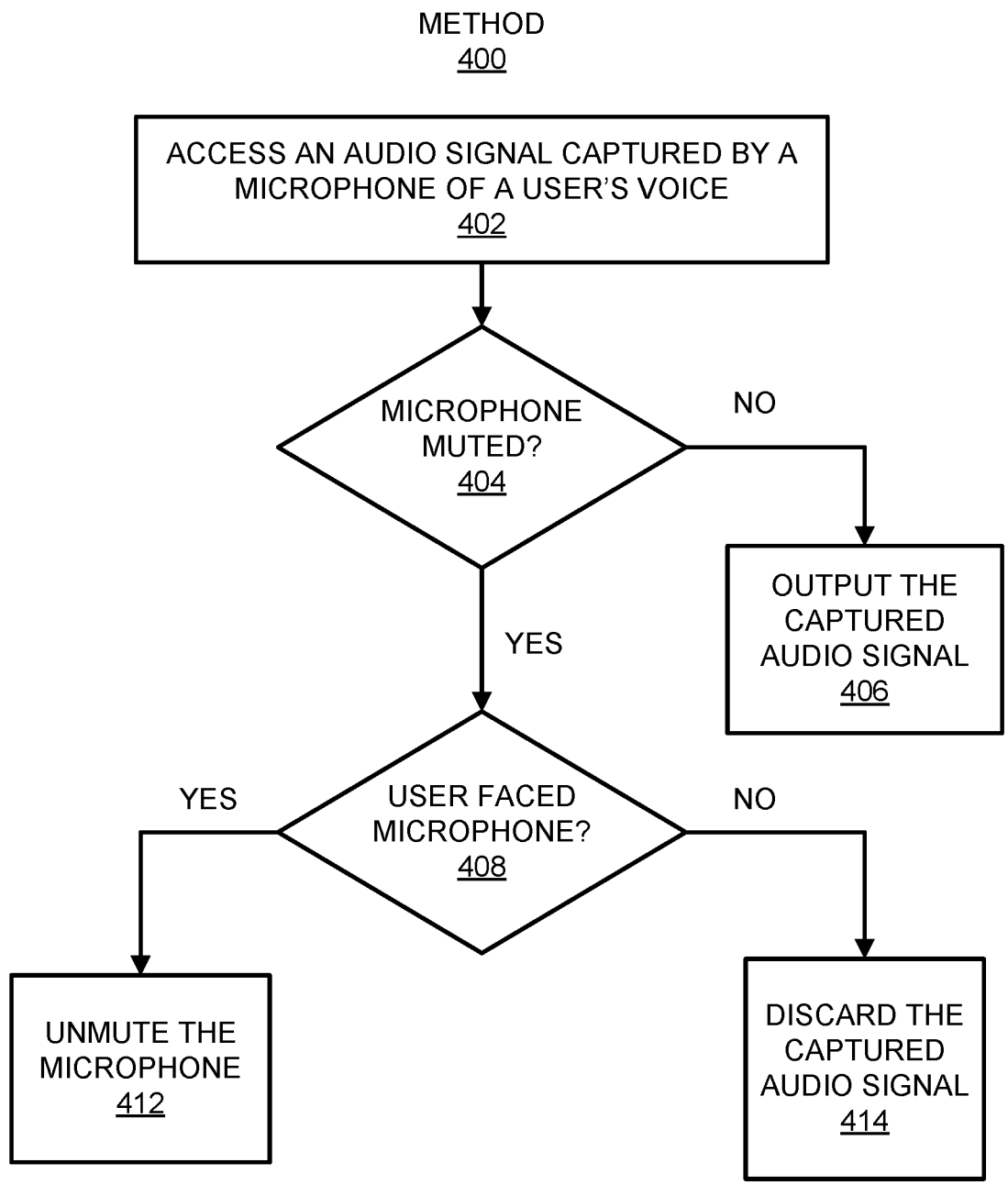
FIGS. 4 and 5, respectively, depict example methods for automatically unmuting a microphone based on a determination as to whether a user was facing the microphone when the user spoke.
Figure 5:
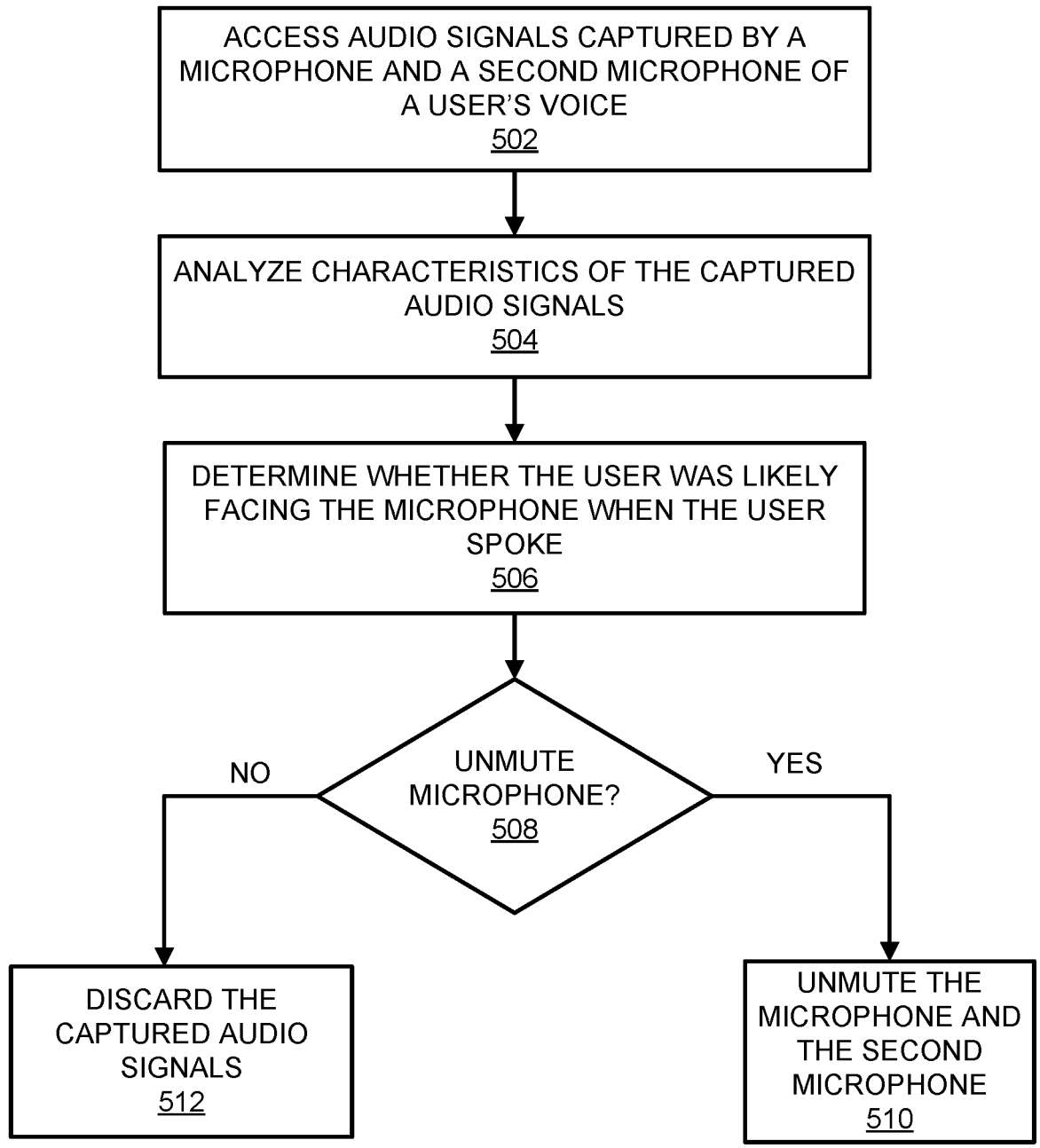

Various manners in which the apparatuses 100, 300 may be implemented are discussed in greater detail with respect to the method 400 depicted in FIGS. 4 and 5. Particularly, FIGS. 4 and 5, respectively, depict example methods 400 and 500 for automatically unmuting a microphone 204 based on a determination as to whether a user 220 was facing the microphone 204 when the user 220 spoke. It should be apparent to those of ordinary skill in the art that the example methods 400 and 500 may represent generalized illustrations and that other operations may be added or existing operations may be removed, modified, or rearranged without departing from the scopes of the methods 400 and 500.

The descriptions of the methods 400 and 500 are made with reference to the apparatuses 100, 300 illustrated in FIGS. 1-3 for purposes of illustration. It should be understood that apparatuses having other configurations may be implemented to perform the methods 400 and/or 500 without departing from the scopes of the method 400 and/or the method 500.

At block 402, the processor 102, 302 may access an audio signal 222 captured by a microphone 204 of a user's 220 voice. At block 404, the processor 102, 302 may determine whether the microphone 204 was in a muted state when the microphone 204 captured the audio signal 222 of the user's 220 voice. Based on a determination that the microphone 204 was not in the muted state when the microphone 204 captured the audio signal 222 of the user's 220 voice, at block 406, the processor 102, 302 may output the captured audio signal 222. The processor 102, 302 may output the captured audio signal 222 in any of the manners described herein.

However, based on a determination that the microphone 204 was in the muted state when the microphone 204 captured the audio signal 222 of the user's voice, at block 408, the processor 102, 302 may apply a machine learning model on the captured audio signal 222 to determine whether the user 220 was likely facing the microphone 204 when the user 220 spoke. Based on a determination that the user 220 was likely facing the microphone 204 when the user 220 spoke, at block 412, the processor 102, 302 may unmute the microphone 204. In addition, the processor 102, 302 may output the captured audio signal at block 406. However, based on a determination that the user 220 was likely not facing the microphone 204 when the user 220 spoke, at block 414, the processor 102, 302 may discard the captured audio signal 414.

Turning now to FIG. 5, at block 502, the processor 102, 302 may access audio signals captured by a microphone 204 and a second microphone 226. That is, the processor 102, 302 may access an audio signal, e.g., an audio file containing the audio signal, captured by the microphone 204 and a second audio signal 224 captured by the second microphone 226. In some examples, the audio signals 222, 224 may be captured while the microphone 204 and the second microphone 226 are each in a muted state. In addition, the second microphone 226 may be spaced from the microphone 204 as discussed herein.

At block 504, the processor 102, 302 may analyze characteristics of the audio 222 captured by the microphone 204 and the second audio 224 captured by the second microphone 226. For instance, the processor 102, 302 may analyze the captured audio 222, 224 to determine the timings at which the audio signals 222, 224 were captured.

At block 506, the processor 102, 302 may determine whether the user 220 was likely facing the microphone 204 and the second microphone 226 while the user 220 spoke based on the analyzed characteristics. For instance, the processor 102, 302 may determine that the user was likely facing the microphone 204 and the second microphone 226 based on the timings being within a predefined time period.

At block 508, the processor 102, 302 may determine whether the microphone 204 and the second microphone 226 are to be placed into the unmuted state based on both the determination that the user 220 was facing the microphone 204 through application of the machine learning model and the determination that the user 220 was facing the microphone 204 and the second microphone 226 based on the analyzed characteristics. That is, the processor 102 302 may determine that the user 220 was facing the microphone 204 and the second microphone 226 when the user 220 has both been determined to likely have been facing the microphone 204 when the user spoke through application of the machine learning model and through analysis of the audio signals 222 and 224. However, the processor 102, 302 may determine that the user 220 was not facing the microphone 204 or the second microphone 226 when the user 220 has not been determined to likely have been facing the microphone 204 when the user spoke through application of the machine learning model or through analysis of the audio signals 222 and 224.

Based on a determination that the user 220 was likely facing the microphone 204 and the second microphone 226 when the user 220 spoke, at block 510, the processor 102, 302 may unmute the microphone 204 and the second microphone 226. However, based on a determination that the user 220 was likely not facing the microphone 204 and the second microphone 226 when the user 220 spoke, at block 512, the processor 102, 302 may discard the captured audio signal 222 and the second captured audio signal 224.

Some or all of the operations set forth in the methods 400 and/or 500 may be included as utilities, programs, or subprograms, in any desired computer accessible medium. In addition, some or all of the operations set forth in the methods 400 and/or 500 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 6, there is shown a block diagram of an example non-transitory computer readable medium 600 that may have stored thereon machine readable instructions that when executed by a processor, may cause the processor to prompt a user 220 to unmute a microphone 204 based on a determination that the user 220 was likely facing the microphone 204 when the user spoke. It should be understood that the non-transitory computer readable medium 600 depicted in FIG. 6 may include additional instructions and that some of the instructions described herein may be removed and/or modified without departing from the scope of the non-transitory computer readable medium 600 disclosed herein. The description of the non-transitory computer readable medium 600 is made with reference to the apparatuses 100, 300 illustrated in FIGS. 1-3 for purposes of illustration.

The non-transitory computer readable medium 600 may have stored thereon machine readable instructions 602-608 that a processor, such as the processor 102 depicted in FIG. 1, may execute. The non-transitory computer readable medium 600 may be an electronic, magnetic, optical, or other physical storage device that contains or stores executable instructions. The non-transitory computer readable medium 600 may be, for example, Random Access memory (RAM), an Electrically Erasable Programmable Read-Only Memory (EEPROM), a storage device, an optical disc, and the like. The term "non-transitory" does not encompass transitory propagating signals.

The processor may fetch, decode, and execute the instructions 602 to access an audio file of a user's speech captured by a microphone 204. The processor may fetch, decode, and execute the instructions 604 to determine whether the microphone 204 was in a muted state when the microphone 204 captured the user's speech. The processor may fetch, decode, and execute the instructions 606 to, based on a determination that the microphone 204 was in the muted state when the microphone 204 captured the user's speech, apply a machine learning model on the captured user's speech to determine whether the user was likely facing the microphone 204 when the user spoke, the machine learning model being generated using a classifier that was trained using training data corresponding to user's directions during the user's speech. In addition, the processor may fetch, decode, and execute the instructions 608 to, based on a determination that the user 220 was likely facing the microphone 204 when the user 220 spoke, output an indication for the user 220 to place the microphone 204 into an unmuted state.

Although not shown in FIG. 6, the non-transitory computer readable medium may also include instructions that may cause the processor to output the captured audio file through a communication interface based on a determination that the user was likely facing the microphone when the user spoke. In addition, or alternatively, the non-transitory computer readable medium may also include instructions that may cause the processor to access a second audio captured by a second microphone 226 of the user's speech while the second microphone 226 is in a muted state, the second microphone 226 being spaced from the microphone 204, analyze characteristics of the audio captured by the microphone 204 and the second audio captured by the second microphone 226, determine whether the user 220 was facing the microphone 204 and the second microphone 226 while the user 220 spoke based on the analyzed characteristics, and determine whether the microphone 204 is to be placed into the unmuted state or to remain in the muted state based on both the determination that the user 220 was facing the microphone 204 through application of the machine learning model and the determination that the user 220 was facing the microphone 204 and the second microphone 226 based on the analyzed characteristics.

Although described specifically throughout the entirety of the instant disclosure, representative examples of the present disclosure have utility over a wide range of applications, and the above discussion is not intended and should not be construed to be limiting but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
 a processor; and
 a non-transitory computer readable medium on which is stored instructions that when executed by the processor, cause the processor to:
  access an audio signal captured by a microphone of a user's speech while the microphone is in a muted state;
  analyze a frequency content of the captured audio signal to determine whether the user was facing the microphone while the user spoke, by determining whether the frequency content of the captured audio signal is higher than a threshold frequency; and
  in response to a determination that the user was facing the microphone while the user spoke based on a determination that the frequency content of the captured audio signal is higher than the threshold frequency, unmute the microphone.

2. The apparatus of claim 1, further comprising:
 a communication interface; and
 wherein the instructions further cause the processor to:
 output the captured audio signal through the communication interface based on the determination that the user was facing the microphone while the user spoke.

3. The apparatus of claim 1, wherein the instructions further cause the processor to:
 based on a determination that the user was not facing the microphone while the user spoke, maintain the microphone in the muted state.

4. The apparatus of claim 1, wherein the instructions further cause the processor to:
 based on a determination that the user was not facing the microphone while the user spoke, discard the captured audio signal.

5. The apparatus of claim 1, wherein to access the audio signal captured by the microphone, the instructions further cause the processor to:
 receive a data file including the captured audio signal via a network from a remotely located electronic device; and
 output an instruction to the remotely located electronic device via the network to unmute the microphone.

6. The apparatus of claim 1, wherein the instructions further cause the processor to:
 access a second audio signal captured by a second microphone of the user's speech while the second microphone is in a muted state, the second microphone being spaced from the microphone;
 analyze characteristics of the audio signal captured by the microphone and the second audio signal captured by the second microphone;
 determine whether the user was facing the microphone and the second microphone while the user spoke based on the analyzed characteristics; and
 determine whether to unmute the microphone and the second microphone based on both the determination that the user was facing the microphone through analysis of the frequency content of the captured audio signal and a determination that the user was facing the microphone and the second microphone based on the analyzed characteristics.

7. The apparatus of claim 1, wherein the instructions further cause the processor to:
 determine whether the microphone is in the muted state;
 analyze the frequency content of the captured audio signal to determine whether the user was facing the microphone while the user spoke based on a determination that the microphone is in the muted state; and
 output the captured audio signal without analyzing the frequency content of the captured audio signal based on a determination that the microphone is not in the muted state.

8. The apparatus of claim 1, wherein the instructions cause the processor to access the audio signal captured by the microphone during a conference call.

9. A non-transitory computer readable medium storing machine readable instructions that when executed by a processor cause the processor to:
 access an audio signal captured by a microphone of a user's speech while the microphone is in a muted state;
 analyze a frequency content of the captured audio signal to determine whether the user was facing the microphone while the user spoke, by determining whether the frequency content of the captured audio signal is higher than a threshold frequency; and
 in response to a determination that the user was facing the microphone while the user spoke based on a determination that the frequency content of the captured audio signal is higher than the threshold frequency, unmute the microphone.

10. The non-transitory computer readable medium of claim 9, wherein the instructions further cause the processor to:

output the captured audio signal through a communication interface based on the determination that the user was facing the microphone while the user spoke.

11. The non-transitory computer readable medium of claim 9, wherein the instructions further cause the processor to:

based on a determination that the user was not facing the microphone while the user spoke, maintain the microphone in the muted state and discard the captured audio signal.

12. The non-transitory computer readable medium of claim 9, wherein the instructions further cause the processor to:

determine whether the microphone is in the muted state;

analyze the frequency content of the captured audio signal to determine whether the user was facing the microphone while the user spoke based on a determination that the microphone is in the muted state; and output the captured audio signal without analyzing the frequency content of the captured audio signal based on a determination that the microphone is not in the muted state.

13. A method comprising:

accessing, by a processor, an audio signal captured by a microphone of a user's speech while the microphone is in a muted state;

analyzing, by the processor, a frequency content of the captured audio signal to determine whether the user was facing the microphone while the user spoke, by determining whether the frequency content of the captured audio signal is higher than a threshold frequency; and in response to a determination that the user was facing the microphone while the user spoke based on a determination that the frequency content of the captured audio signal is higher than the threshold frequency, unmuting, by the processor, the microphone.

14. The method of claim 13, further comprising:

based on a determination that the user was not facing the microphone while the user spoke, maintaining the microphone in the muted state and discarding the captured audio signal.

15. The method of claim 13, further comprising:

determining whether the microphone is in the muted state;

analyze the frequency content of the captured audio signal to determine whether the user was facing the microphone while the user spoke based on a determination that the microphone is in the muted state; and output the captured audio signal without analyzing the frequency content of the captured audio signal based on a determination that the microphone is not in the muted state.

* * * * *